3,196,096
METHOD FOR THE POLYMERIZATION OF OLEFINS BY ULTRASONIC VIBRATIONS
Harry A. Toulmin, Jr., Dayton, Ohio, assignor to The Commonwealth Engineering Company of Ohio, Dayton, Ohio
No Drawing. Filed Jan. 22, 1962, Ser. No. 167,972
3 Claims. (Cl. 204—154)

This invention relates to a process for the polymerization of hydrocarbons, and more particularly to a process for producing hydrocarbon polymers employing ultrasonic wave vibrations and without the use of a catalyst, such as in conventional processes, to effect the polymerization.

Polymerization processes, heretofore, have required the presence of a catalyst to bring about polymerization of hydrocarbons in a relatively short time as desired. Insofar as is known, all commercially useful processes utilize a catalyst in the carrying out of polymerization methods. The present process entirely eliminates the need for employing such catalysts.

It is an object of this invention to provide a new process for the polymerization of hydrocarbons, particularly olefins, and wherein the treatment comprises subjecting the hydrocarbon or mixture of hydrocarbons to ultrasonic wave vibration at a predetermined temperature to bring about the polymerization of the hydrocarbon, or copolymerization of the mixture of hydrocarbons.

In accordance with the process, polymers may be produced in high yield which are oily, amorphous or solid resinous substances depending upon the hydrocarbon or mixtures thereof used.

A further object of the invention is to provide an improved process wherein the polymerization of hydrocarbons can be carried out with greater speed and with the production of good yields.

In accordance with the process of this invention, the polymerization of the hydrocarbon is effected while cooled to a relatively low temperature and such as may approach the congealing point of the hydrocarbon. The polymerization process is adapted to be carried out at relatively low temperatures and low pressures. Gaseous hydrocarbons such as obtained from the distillation of petroleum oil and fractions and containing from 2 to 10 carbon atoms in the molecule may be polymerized to form polymers and/or copolymers.

Ultrasonic wave vibrations, and which are employed in the process of this invention, have a frequency of about 17,000 cycles per second or above. This high frequency is above the upper limit of the frequency response of the human ear. Such ultrasonic vibrations may be produced by a suitable electronic generator or transducer unit and which generates and converts high frequency electrical energy to vibrational wave energy.

The temperature and pressures used in carrying out the process of the invention varies depending upon the material being treated. In general the temperature is in the range of $-100°$ C. to $-200°$ C., and the pressure from 2 to 50 atmospheres. Preferably, the temperature is sufficiently low to cause the molecules to approach relatively close to each other while being subjected to the externally applied ultrasonic wave vibrations. Frequencies between 17 and 30 kilocycles per second (kc./s.) are suitable for carrying out the process, although higher frequencies may be used where the same is desired.

The following examples will serve to illustrate the present invention.

*Example 1*

Gaseous n-butylene is confined in a polymerization chamber under a pressure of 10 atmospheres and at a temperature of $-150°$ C. while subjected to ultrasonic wave vibrations of 22 kc./s. The treatment is continued for 30 minutes or until the butylene is polymerized to an oily resinous polymer mass.

*Example 2*

A copolymer of propylene and butylene is produced by admixing equal volumes of the same in a polymerization chamber, and carrying out the polymerization as in Example 1, using a temperature of $-100°$ C. and pressure of 1½ atmospheres.

*Example 3*

In this example isobutylene is polymerized by confining the same under a pressure of 15 atmospheres and at a temperature of $-100°$ C. while subjecting the cooled mass to ultrasonic wave vibrations of 25 kc./s., for one hour.

*Example 4*

Ethylene is treated as described in Example 1, and wherein the temperature is held to $-200°$ C. and under a pressure of thirty atmospheres to produce a polymerized ethylene.

While the invention has been described and examples given to teach those skilled in the art how my inventive polymerization process may be used to carry out various polymerization processes, substitutions and changes may be made relative to temperatures and pressures while employing ultrasonic wave vibrations by those using the process without departing from the spirit and scope of the claims.

What is claimed is:

1. A process for the polymerization of olefins which consists in subjecting olefins to the action of ultrasonic wave vibrations at temperatures ranging from $-100°$ C. to $-200°$ C. and a pressure ranging from 2 to 50 atmospheres.

2. The process of claim 1, wherein the olefin is selected from the group consisting of ethylene, propylene and butylene.

3. The process of claim 1, wherein the ultrasonic wave vibrations have a frequency range of between 17 and 30 kilocycles.

References Cited by the Examiner

UNITED STATES PATENTS

| 2,606,174 | 8/52 | Kolthoff et al. | 204—154 |
| 2,899,414 | 8/59 | Mertes | 204—154 |
| 3,008,886 | 1/61 | Sarantites | 204—154 |

FOREIGN PATENTS

| 499,577 | 1/54 | Canada. |

MURRAY TILLMAN, *Primary Examiner.*